US009395252B1

(12) United States Patent
Frounfelker et al.

(10) Patent No.: US 9,395,252 B1
(45) Date of Patent: Jul. 19, 2016

(54) METHOD OF ESTIMATING INTERNAL DIELECTRIC FLUID TEMPERATURE OF AN ELECTRICAL DEVICE

(71) Applicant: Dynamic Ratings Pty Ltd., Victoria (AU)

(72) Inventors: Ethan C. Frounfelker, West Bend, WI (US); Mark D. Tostrud, Wauwatosa, WI (US)

(73) Assignee: Dynamic Ratings Pty Ltd., Victoria (AT)

( * ) Notice: Subject to any disclaimer, the term of this patent is extended or adjusted under 35 U.S.C. 154(b) by 580 days.

(21) Appl. No.: 13/760,269

(22) Filed: Feb. 6, 2013

Related U.S. Application Data

(60) Provisional application No. 61/595,290, filed on Feb. 6, 2012.

(51) Int. Cl.
*G01K 15/00* (2006.01)
*G01K 13/00* (2006.01)
*G01K 1/00* (2006.01)

(52) U.S. Cl.
CPC ..................................... *G01K 13/00* (2013.01)

(58) Field of Classification Search
USPC .............................. 374/1, 147, 148, 152, 208
See application file for complete search history.

(56) References Cited

U.S. PATENT DOCUMENTS

| | | | | |
|---|---|---|---|---|
| 5,694,166 A * | 12/1997 | Fukushima | ................ | 348/231.7 |
| 6,022,138 A * | 2/2000 | Sonander | ......................... | 374/28 |
| 2003/0056501 A1 * | 3/2003 | Ueno et al. | ...................... | 60/297 |
| 2005/0252497 A1 * | 11/2005 | Yasui et al. | ................... | 123/697 |
| 2007/0137318 A1 * | 6/2007 | Desrochers et al. | ........ | 73/863.81 |
| 2009/0097525 A1 * | 4/2009 | Ibuki et al. | ...................... | 374/29 |
| 2009/0180514 A1 * | 7/2009 | Anderson | ........................ | 374/54 |
| 2010/0235141 A1 * | 9/2010 | Wang et al. | .................. | 702/183 |
| 2011/0090938 A1 * | 4/2011 | Akins | ....................... | G01K 7/24 374/185 |
| 2013/0167554 A1 * | 7/2013 | Parsons | ............................ | 60/803 |
| 2014/0177673 A1 * | 6/2014 | Bliss et al. | .................... | 374/165 |

* cited by examiner

*Primary Examiner* — Mirellys Jagan
(74) *Attorney, Agent, or Firm* — Boyle Fredrickson, S.C.

(57) ABSTRACT

A system and method for estimating a temperature of a fluid contained in an electrical device such as a transformer, circuit breaker, or reactor without direct thermal communication with the fluid is disclosed. The method includes measuring a temperature of an exterior wall of a housing of the electrical device, measuring an ambient temperature around the housing, and estimating a temperature of the fluid within the housing using the measured wall temperature and the measured ambient temperature. In a preferred aspect, the method also adjusts the estimated fluid temperature for one or more of ambient humidity conditions, conductive, convective, and radiation heat transfer properties associated with operation of the underlying electrical device.

19 Claims, 4 Drawing Sheets

METHOD OF ESTIMATING INTERNAL DIELECTRIC FLUID TEMPERATURE OF AN ELECTRICAL DEVICE

CROSS REFERENCE TO RELATED PATENT APPLICATIONS

This application is a non-provisional patent application and claims priority to U.S. Provisional Patent Application Ser. No. 61/595,290 filed on Feb. 6, 2012 titled "Method of Estimating Internal Oil Temperature In An Electrical Transformer" and the disclosure of which is expressly incorporated herein.

BACKGROUND AND SUMMARY OF THE INVENTION

Electrical transformers commonly transfer electrical energy from one electrical circuit to another electrical circuit through inductively coupled conductors or coils. Such transformers commonly include one or more conductive coils that are maintained in proximity to one another such that electrical power can be input through a primary or first coil and generates electrical output power in a secondary, adjacent, or second coil. A varying current in the first or primary winding or coil creates a varying magnetic flux in a core and thereby a varying magnetic field in a second winding or coil. The varying magnetic field induces an electromotive force in the secondary coil thereby inducing the electrical output voltage. Such electrical transformers perform many power manipulation processes in many industrial, commercial, and residential applications.

Desired operation of such transformers relies heavily on proper operation of the respective windings associated with the primary and secondary coils. Temperature deviations and thermal localizations associated with either of the primary or secondary windings can adversely affect the ability of the respective coils to conduct the input and/or output electrical power associated with the respective coil. Many such transformers are commonly filled with a dielectric fluid, such as mineral oil, natural or synthetic ester fluids or silicon oil in order to maintain a desired thermal operation of the transformer and to mitigate temperature conditions that can detract from the desired operation of the transformer. Left unaddressed, such deviations can result in failure of the respective coil and/or ultimate failure of the transformer and/or unsuitability of the transformer for its intended purpose.

An accurate model of the transformer's thermal performance is needed to simulate how the transformer will respond in power applications during operation of the transformer. As part of acceptance testing on new units, the temperature of the fluid is measured to demonstrate that the temperature of the fluid does not exceed acceptable limits associated with the intended operation of the transformer. The accuracy of the fluid temperature calculations can vary as a function of the accuracy of the information provided or the accuracy of the measured temperature.

When designing new transformers, engineers utilize theoretical parameters to calculate parameters associated with the thermal performance of the transformer. The various parameters cannot be proved until the transformer is tested. That is, similar to calculating winding and winding hot spot temperatures, transformer dielectric fluid temperature calculations are based on environmental and transformer operating conditions along with the transformer design parameters expressed as equation variables. Comparing measured dielectric fluid temperatures to the theoretical calculated dielectric fluid temperatures can provide confirmation of the equation variables and create more accurate models of the thermal performance of the transformer.

Resistance thermometers, also called resistance temperature detectors or resistive thermal devices (RTD's), are sensors that measure temperature by correlating the resistance of the RTD element with temperature. RTD's are commonly used to measure transformer temperatures. Such RTD's can be provided in both wet and dry configurations. In a wet application, the RTD can be directly exposed to the dielectric fluid internal to the housing of the transformer. Some transformer constructions however will not tolerate wet RTD temperature assessments. Transformer users may also elect to use a dry application, to eliminate the risk of dielectric fluid leaks that may occur when using a wet application. In dry applications, the RTD is disposed in a well that is isolated from the fluid flow or secured, via a magnetic or more permanent interaction, to the outside surface of the transformer.

Temperature measurements associated with the dry implementation of such RTD's can be substantially different than actual fluid temperatures due to various thermodynamic factors associated with the communication of heat from the fluid both through the housing and from the housing to atmosphere. That is, the temperature difference between the internal dielectric fluid temperature and an external tank wall measured temperature can be affected by each of the three methods of heat transfer—convection of the heat from the transformer dielectric fluid to the inner tank wall, conduction of heat through the tank wall, and radiation from the outside tank wall to the outside air. This deviation between such measured and actual temperatures is further explained below with respect to one of the plot lines shown in 4.

Ambient testing conditions and ambient operational conditions can also affect the ability to accurately estimate actual conditions associated with operation of the transformer in an intended environment. That is, environmental conditions such as sunlight and relative humidity can also affect the thermal performance associated with operation of a transformer. These environmental variables can also contribute to deviations between actual and measured values that are not otherwise accommodated or addressed in estimating the operational performance of a given transformer. Accordingly, there is a need for a system and method of more accurately estimating the operating temperature of the fluid of a transformer from measured temperatures external to the cavity of the transformer.

Similar considerations can also be addressed in the design, construction, testing, and operation of other devices such as circuit breakers, reactors, or other fluid filled devices where it would be advantageous to be able to estimate the temperature of the internal fluid from parameters attained at locations external to the fluid volume. Such a methodology provides for convenient user interaction with the measuring devices and can yield simplified device constructions by limiting the through holes and connectivity requirements associated with internally positioned monitoring or assessment components.

One aspect of the invention contemplates a method of estimating the temperature of a fluid within a housing having a wall. The method includes measuring a temperature of a wall of a housing and measuring an ambient temperature around the housing. The method estimates a temperature of a fluid within the housing using the measured temperature of the wall and the measured ambient temperature.

Another aspect of the invention contemplates a method of estimating the temperature of a fluid contained within a housing defined by a wall—such as the dielectric fluid within a housing of an electrical device. The method includes measuring a temperature of the wall of the housing, measuring an ambient air temperature around the housing; and measuring a relative humidity of air around the housing. The method estimates a temperature of a fluid within the housing as a function of the measured temperature of the wall, the measured ambient air temperature, and the measured relative humidity.

A further aspect of the invention contemplates a system for estimating a temperature of a fluid of a transformer. The system includes a first sensor that is fluidly isolated from the fluid contained in a housing and configured to measure a temperature of the housing of the transformer. A second sensor is configured to measure an ambient temperature around the housing and a controller is connected to the first and second sensors and configured to estimate a temperature of the fluid contained in the housing.

Another aspect of the invention contemplates determining or calculating a heat transfer property of one or more of convection heat transfer between the fluid within the housing and the housing, conduction heat transfer through the wall of the housing, and radiation heat transfer from the wall to atmosphere around the housing and manipulating the estimated temperature of the fluid as a function of the heat transfer property associated with a transformer.

These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

Figure 1:
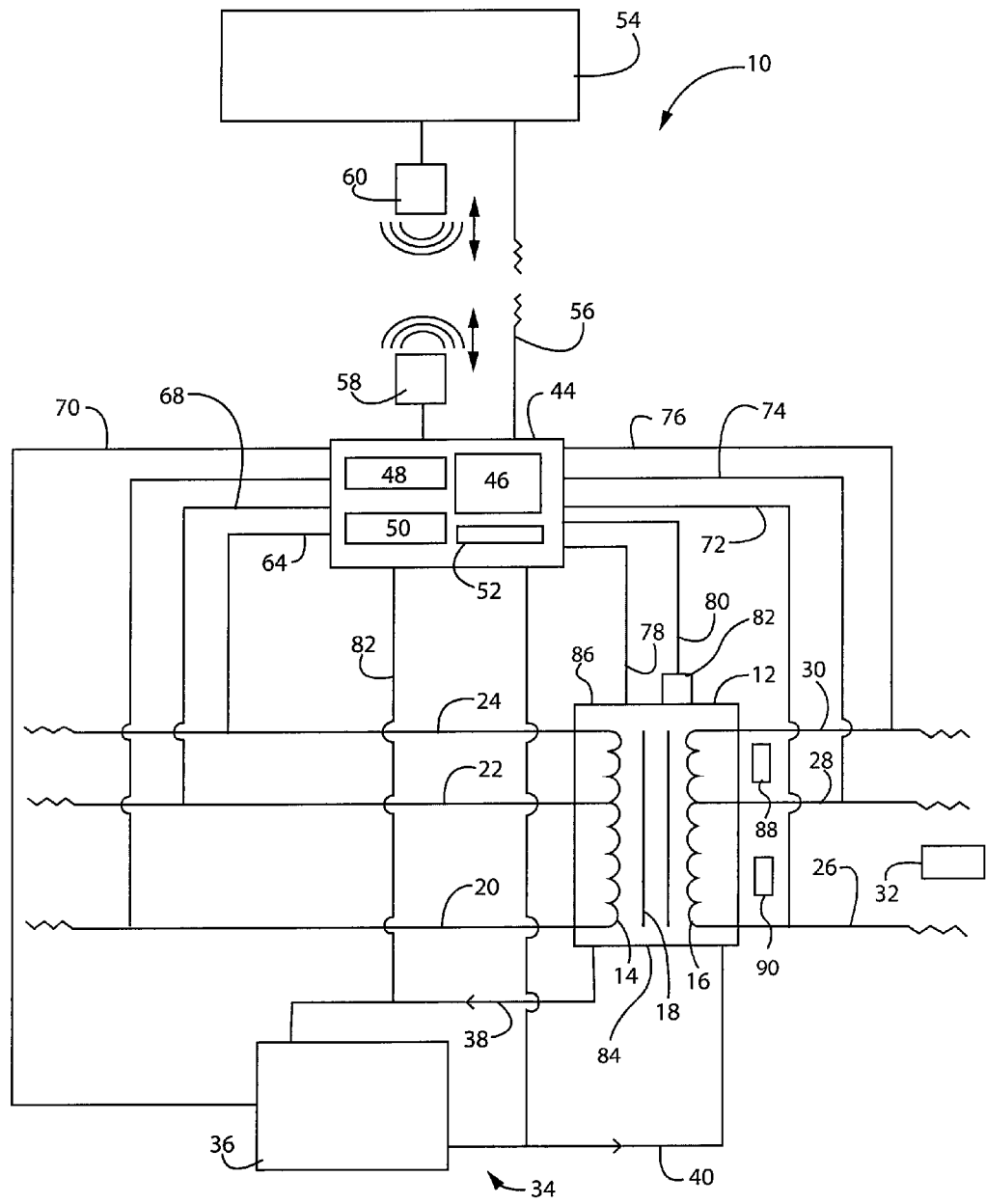
FIG. 1 is a schematic representation of an exemplary power transformer system equipped with a control system according to the present invention.

FIG. 1 shows an exemplary electrical device such as a transformer power system 10 constructed in accordance with the present invention. It is appreciated that the present invention is applicable to other electrical devices, such as circuit breakers or reactors, that include a cooling fluid whose temperature is desired to be monitored or estimated. Transformer power system 10 includes a transformer 12 having a power or input coil 14 that is inductively coupled to an output or load coil 16 by an inductive core 18. Each of input coil 14 and output coil 16 can include one or more optional taps 20, 22, 24, 26, 28, 30 arranged to transfer electrical power between input coil 14 and output coil 16 via the inductive relationship between each coil 14, 16 and core 18. It is appreciated that transformer 12 may include a single input circuit and a single output circuit associated with generating a desired electrical output signal from an available input electrical power signal.

Regardless of the number of input and/or output load taps, a load 32 is connected to one or more of taps 26, 28, 30 associated with output coil 16 such that the desired electrical power can be supplied to load 32 from the input power supplied to transformer 12 via taps 20, 22, 24 associated with input coil 14. Transformer 12 is configured to communicate with an optional cooling system 34 which may include an optional heat sink 36 associated with circulating a dielectric fluid, such as mineral oil, via one or more circulation lines 38, 40. It is further appreciated that transformer 12 may include one or more volumes of dielectric fluid associated with maintaining a desired operating temperature of transformer 12, coil 14, and/or coil 16.

Transformer power system 10 can include an optional control system 44 configured to monitor and possibly manipulate operation of transformer 12. Optional control system 44 includes a display 46, a processor 48, a random access memory 50, and can include one or more inputs 52 configured to allow user interaction with one or more of processor 48 and/or random-access memory 50. An optional computer system 54 can be connected to processor 44 via a permanent wired connection 56 or a wireless communication interface that includes one or more wireless communication modules 58, 60 configured to allow wireless communication between processor 44 and supplemental control systems such as computer 54. It is appreciated that processor 44 and/or computer 54 can be configured to allow operation and/or monitoring of one or more transformers 12. It is further appreciated that although processor 44 and computer 54 are shown as separate devices, the functionality of such devices can be integrated into a single unitary device. It is further appreciated that processor 44 and/or computer 54 can be positioned proximate transformer 12 and/or remote therefrom. Regardless of the specific configuration and/or location, processor 44 and/or computer 54 are configured to allow user interaction, monitoring, and/or manipulation of the various systems associated with the operation of transformer 12.

Processor 48 can be configured to receive and/or communicate instructions to one or more connections 64, 66, and 68 associated with input coil 14, connections 72, 74, and 76 associated with output coil 16, connections 78 and 80 associated with transformer 12, and/or connections 70 and 82 associated with dielectric fluid system 36. It should be appreciated that the various connections described above are merely exemplary of various connections usable for assessing the electrical and thermal operation of transformer 12 of power system 10. One or more of connections 70, 78, and 80 are associated with one or more thermal sensors or resistive thermal devices (RTD) 82, associated with monitoring the temperature of a wall 84 of a housing 86 of transformer 12 for detecting or measuring thermal performance associated with operation of transformer 12, coils 14, 16, and/or oil cooling system 36. It is appreciated that each RTD 82 can be connected to one or more of the various connections and can be configured to be electrically connected or wirelessly communicate with processor 48 of control system 44 and/or computer 54 in a manner similar to the communication system associated with transmitters/receivers 58, 60 disposed between control system 44 and computer 54. It is further appreciated that the graphical representation of power system 10 is merely exemplary of one such transformer based power system useable with the control system 44 of the present invention.

Preferably, another temperature sensor 88 and a humidity sensor 90 are provided and operationally connected to a control, such as control system 44, so as to communicate measured ambient temperature and humidity conditions to the control system 44. Preferably, sensor 88 and sensor 90 communicate temperature and humidity data associated with an air environment that surrounds housing 86 of transformer 12.

Although shown as separate bodies, it is appreciated that the functionality of sensors 88, 90 could be combined into a single structure. It is also appreciated that transformer power system 10 is an example of one power transformer system configuration and control arrangement associated with use of the present invention. Said in another way, the present invention is useable across a wide array of transformer and transformer control system configurations.

Figure 2:
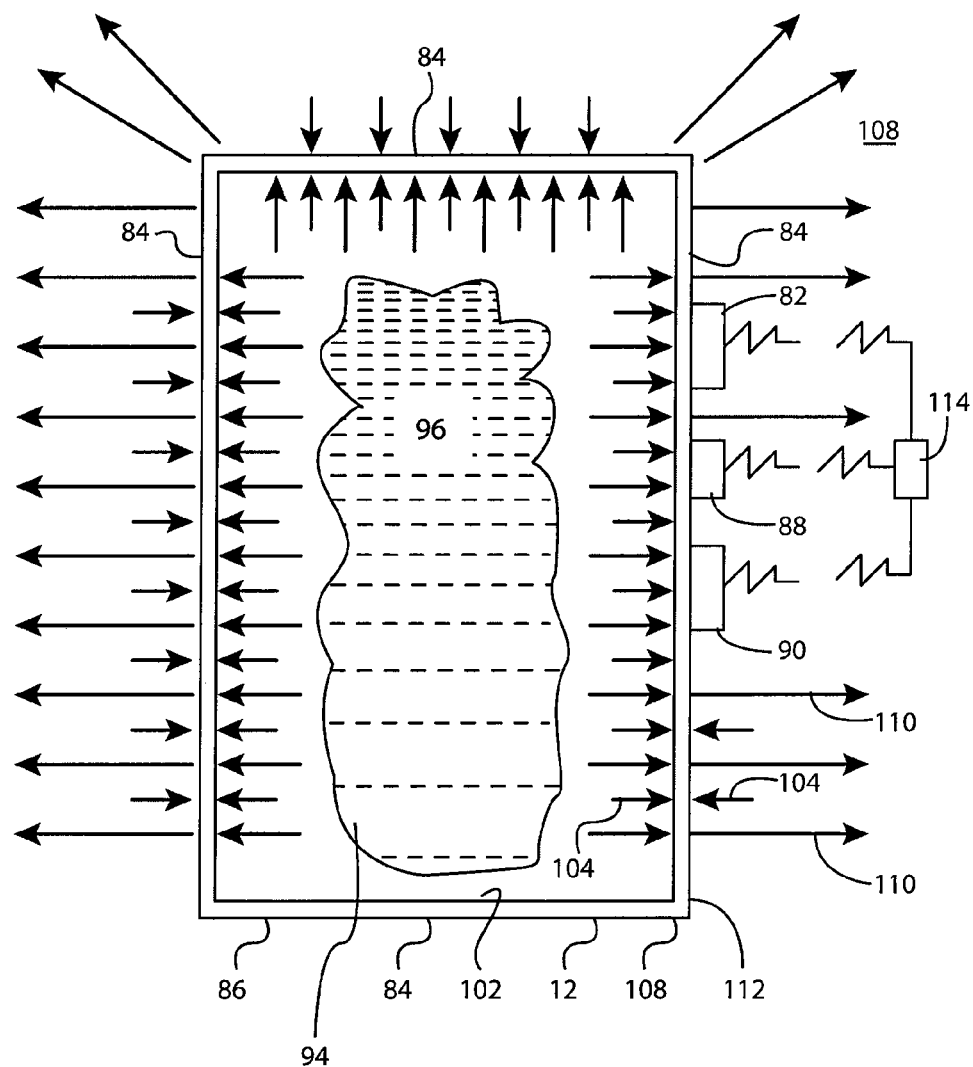
FIG. 2 is simplified cross section of the housing of the transformer shown in FIG. 1.

As shown graphically in FIG. 2, housing 86 of transformer 12 is formed of a number of interconnected walls 84 that define a cavity 94 associated with containing the coils and core(s) associated with the inductive operation of transformer 12. The excess volume of cavity 94 is commonly occupied by a dielectric fluid 96, such as mineral oil, natural or synthetic ester fluids or silicon oil that provides cooling of the core and coils associated with the desired operation of transformer 12. FIG. 2 provides a graphic representation of various thermal exchanges associated with operation of transformer 12. As alluded to above, it is appreciated that housing 86 may be provided in a number of shapes and configurations and be configured to cooperate with or include conductive or inductive structures so as to form circuit breakers, reactors, or electrical devices other than a transformer.

Regardless of the intended use or function of the respective electrical device, for brevity, the following explanation is directed to transformer 12 but those skilled in the art will appreciate that similar considerations are equally applicable to other electrical devices that include a fluid filled housing. A convective thermal exchange, indicated by arrows 100, occurs between fluid 94 and an interior facing surface 102 associated with walls 84 of housing 86 of transformer 12. A conductive thermal exchange, indicated by arrows 104, occurs through the material 106 of housing 86 and facilitates a thermal exchange between housing 84 and an atmosphere 108 that surrounds transformer 12. A radiation exchange, indicated by arrows 110, occurs between an exterior surface 112 of housing 86 and atmosphere 108 such that atmosphere 108 can act as a heat sink during operation of transformer 12. It is appreciated that various heat transfer characteristics, such as the material of housing 84, the geometric construction of housing 84, the relative surface areas of interior 102 and exterior 112 surfaces of housing 84, as well as conditions associated with ambient environment 108 such as temperature, humidity, weather conditions, etc. will affect the thermal performance of transformer 12. As described further below, the system and method described herein provides a method of estimating the temperature of the cooling dielectric fluid from only indirect transformer system temperature information.

Figure 3:
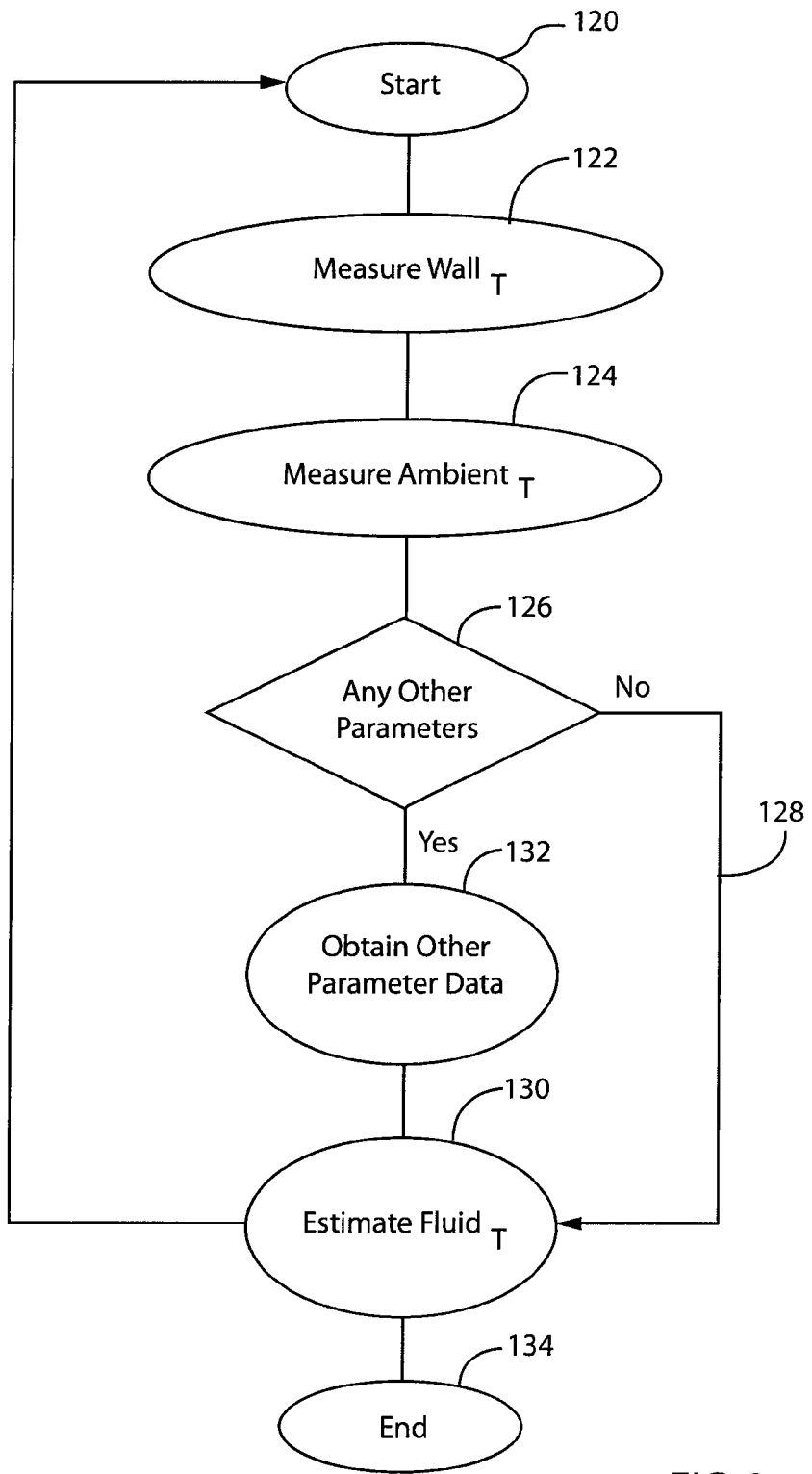
FIG. 3 is a flow diagram showing a method of estimating a fluid temperature associated with the transformer shown in FIGS. 1 and 2.

Referring to FIGS. 2 and 3, sensors 82, 88, and 90 are maintained in close proximity to housing 86 of transformer 12 and operationally connected to a controller 114. As disclosed above, the operational connectivity between sensors 82, 88, and 90 and controller 114 can be provided in either a wired or a wireless interface such that controller 114 can generate a model or estimate as to the operating temperature associated with fluid 96 during operation of transformer 12. Representatively, controller 114, or a processor associated therewith, is configured to assess measured parameters and generate an estimate of the fluid operating temperature of the transformer that is derived from the externally acquired measured temperature values. As described further below, in a preferred embodiment, the method and system of the present invention is configured to manipulate, adjust, or formulate the fluid temperature estimate to address other heat transfer characteristics associated with the given transformer configuration.

Referring to FIGS. 2 and 3, when it is desired to determine an estimate 120 of the fluid temperature associated with operation of a given transformer system, sensor 82 measures a temperature of wall 122 of housing 86. Sensor 82 provides an actual temperature of wall 84 but due to the association of the various heat transfer characteristics mentioned above and the acquisition of an external housing wall temperature, the measured wall temperature is generally insufficient to individually provide a sufficiently accurate estimate of the operating temperature of fluid 96.

Sensor 88 measures an ambient temperature condition 124 associated with operating environment of transformer 12. The process of estimating the temperature of fluid 96 can provide a sufficiently accurate estimate 128, 130 with the measured wall and ambient temperature measurements 122, 124 or can request or be provided with other heat transfer characteristics 132 associated with the operation of a given transformer system. Some examples of other such parameter data can include information specific to the thermal performance of fluid 96, thermal performance of housing 84, operating parameters of coils 14, 15, and/or core 18 or other information associated with the ambient conditions associated with operation of transformer 12. For instance, in one embodiment of the invention, optional sensor 90 measures ambient relative humidity and communicates the same to controller 114 for utilization of the atmospheric humidity information in the assessment and determination of the estimate of the transformer fluid temperature as the humidity information will affect the heat transfer properties between transformer 12 and atmosphere 108.

The present application provides a method of determining the temperature of a fluid of a transformer from externally acquired temperature values associated with the external surface 112 of the transformer housing 86. Such a method mitigates the perforation of housing 86 and provides a fluid temperature assessment system wherein the sensor associated with assessing the fluid temperature are exposed and not otherwise internal relative to housing 86. Such a configuration allows convenient user interaction with the underlying system and/or replacement of a particular sensor.

Having measured the temperature of the exterior surface 112 of wall 84 of housing 86 and the ambient temperature conditions associated with atmosphere 108, controller 114 estimates the temperature of fluid 96 during operation of transformer 12. In order to calculate the internal fluid temperature of the oil during operation of any given transformer, controller 114 estimates the internal dielectric fluid temperature with the following equation:

$$T_o = \frac{(Tm - (R1 \times Ta))}{R2}$$

wherein;
To—is the estimated internal oil temperature;
Tm—is the measured wall temperature as measured by a surface mount RTD sensor;
Ta—is the measured ambient temperature of the surrounding air or atmosphere;
R1—is a variable that preferably resides between about 0.25 to about 0.5; and
R2—is a variable that preferably resides between about 0.5 to about 1.

Although the present invention discloses a method of estimating an internal dielectric fluid temperature based on only an ambient temperature condition and a temperature of the an exterior surface of the transformer, it is appreciated that the accuracy of the internal temperature determination may be improved by incorporating additional environmental parameters; such as relative humidity in the estimate of the internal temperature. The values associated with variables R1 and R2 vary as a function of the remaining heat transfer parameters such as the construction and materials associated with housing 86 and/or the values associated with changes to the ambient conditions such as ambient humidity. It is appreciated that the value of R1 and R2 will vary as a function of changes to the construction of the underlying power transformer system. It is also appreciated that the value of R1 and R2 will vary as a function of the sensor type, accuracy class of the sensor or sensor packaging used for sensor 82. The use of the term "about" evidences applicants appreciation that such changes may result or yield R1 and R2 values that reside beyond the outer limits of the applicable variable although the range specified above should prove adequate for the majority of transformer power system configurations.

Figure 4:
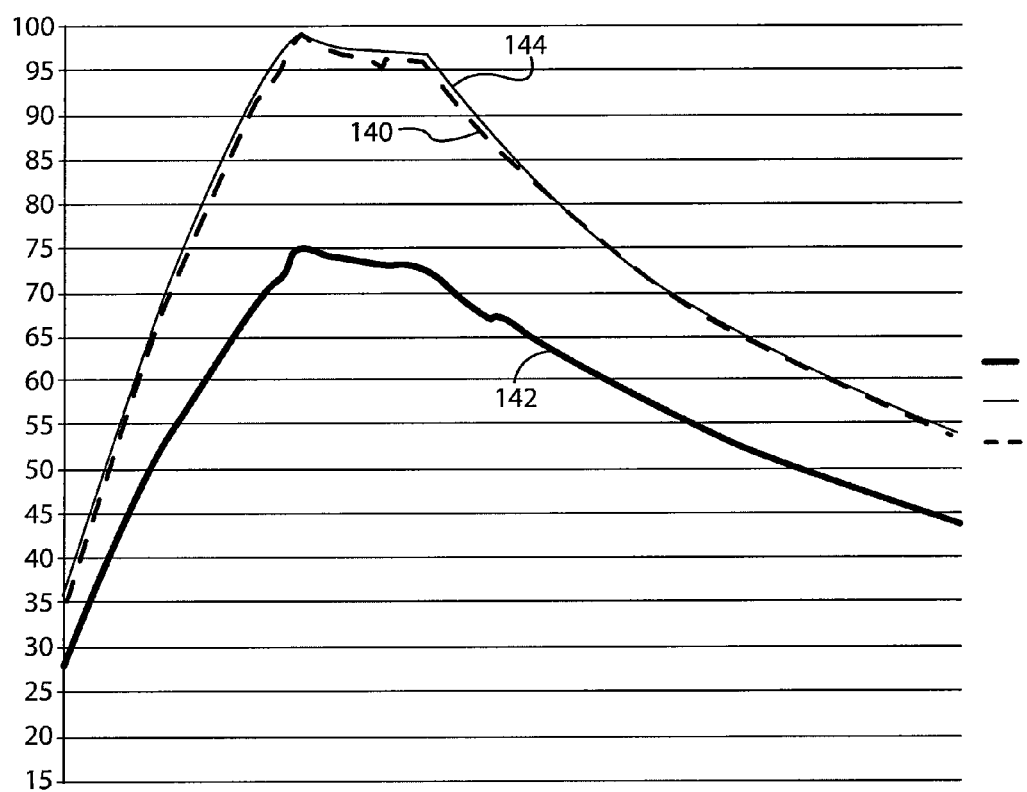
FIG. 4 is a chart showing a comparison of measured transformer housing temperature data, measured fluid temperature data, and estimated fluid temperature data for an exemplary transformer determined according to the present invention.

As evidenced by FIG. 4, the disclosed method and system for estimating the internal temperature of the dielectric fluid without direct measurement of the same provides a dielectric fluid temperature estimate that is surprisingly accurate over extended periods of operation of a transformer. As shown in FIG. 4, curve 140 represents an actual measured temperature of the transformer dielectric fluid, such as mineral oil. Curve 142 represents the measured temperature of the exterior surface of housing 86 during operation of transformer 12. Although curves 140, 142 loosely mimic each other, it can be seen that deviations between the measured dielectric fluid temperature 140 and the measured housing temperature are not uniform across the duration of operation of the transformer such that a single adjustment to the measured transformer housing temperature would provide only limited accuracy to the fluid temperature estimate in as much as the estimated temperature values would periodically be below and above actual temperature values.

Compared to curve 142, curve 144, the estimated fluid temperature curve, nearly perfectly coincides with curve 140 and is the calculated or estimated value of the dielectric fluid temperature using the temperature estimation methods as disclosed herein. The comparison of curves 140, 142, and 144 clearly evidences the improvement in dielectric fluid temperature estimating attained with the present invention and from only external temperature measurements. That is, it is clearly shown that the estimated fluid temperatures, represented by curve 144, very closely correlate to actual measured dielectric fluid temperatures represented by curve 140 thereby proving the usability of the disclosed methods for assessing transformer fluid temperatures from only externally acquired data.

It is appreciated that the system and methods of the present invention may be utilized in testing new transformers to create an accurate model of transformer temperature performance, and overall system thermal performance, even before implementing the transformer into a power application. The method may also be utilized on an existing transformer to create a more accurate model of the transformer's thermal performance, transformer life, and for troubleshooting and/or service requirement activities.

Therefore, one embodiment of the invention contemplates a method of estimating the temperature of a fluid within a housing having a wall. The method includes measuring a temperature of a wall of a housing and measuring an ambient temperature around the housing. The method estimates a temperature of a fluid within the housing using the measured temperature of the wall and the measured ambient temperature.

Another embodiment contemplates a method of estimating the temperature of a fluid contained within a housing defined by a wall—such as the dielectric fluid within a housing of an electrical device. The method includes measuring a temperature of the wall of the housing, measuring an ambient air temperature around the housing; and measuring a relative humidity of air around the housing. The method estimates a temperature of a fluid within the housing as a function of the measured temperature of the wall, the measured ambient air temperature, and the measured relative humidity.

A further embodiment contemplates a system for estimating a temperature of a fluid of a transformer. The system includes a first sensor that is fluidly isolated from the fluid contained in a housing and configured to measure a temperature of the housing of the transformer. A second sensor is configured to measure an ambient temperature around the housing and a controller is connected to the first and second sensors and configured to estimate a temperature of the fluid contained in the housing.

Another embodiment of the invention contemplates determining or calculating a heat transfer property of one or more of convection heat transfer between the fluid within the housing and the housing, conduction heat transfer through the wall of the housing, and radiation heat transfer from the wall to atmosphere around the housing and manipulating the estimated temperature of the fluid as a function of the heat transfer property associated with a transformer.

The present invention has been described in terms of the preferred embodiment, and it is recognized that equivalents, alternatives, and modifications, aside from those expressly stated, are possible and within the scope of the appending claims.

What we claim is:

1. A method of estimating the temperature of a fluid within a housing having a wall, the method including:
   measuring a temperature of a wall of a housing;
   measuring an ambient temperature around the housing; and
   estimating a temperature of the fluid within the housing using the measured temperature of the wall and the measured ambient temperature;
   periodically repeating the steps of measuring the temperature of the wall of the housing and measuring the ambient temperature around the housing; and
   re-estimating the temperature of the fluid within the housing using the temperatures measured during the repeated measurements.

2. The method of claim 1 further comprising enclosing transformer coils with the housing.

3. The method of claim 1 further comprising calculating at least one heat transfer characteristic of at least one of the housing, fluid, and an atmosphere surrounding the housing and adjusting the estimate of the temperature of the fluid within the housing as a function of the at least one heat transfer characteristic.

4. The method of claim 1 wherein the ambient temperature is further defined as an air temperature that surrounds the housing.

5. The method of claim 4 further comprising measuring relative humidity associated with the air temperature that surrounds the housing.

6. The method of claim 5 further comprising adjusting the estimate of the temperature of the fluid within the housing as a function of the measured relative humidity.

7. A method of estimating the temperature of a fluid contained within a housing defined by a wall, the method comprising:
measuring a temperature of a wall of a housing;
measuring an ambient air temperature around the housing;
calculating a relative humidity of air around the housing; and
estimating a temperature of the fluid within the housing as a function of the measured temperature of the wall, the measured ambient air temperature, and the calculated relative humidity;
periodically repeating the steps of measuring the temperature of the wall of the housing, measuring the ambient temperature around the housing, and calculating a relative humidity of air around the housing; and
re-estimating the temperature of the fluid within the housing using the temperatures and relative humidity measured during the repeated measurements.

8. The method of claim 7 further comprising filling a volume of the housing with oil.

9. The method of claim 7 further comprising enclosing a first electrical coil and a second electrical coil within the housing so that the first electrical coil and the second electric coil are inductively coupled to one another.

10. The method of claim 9 further comprising passing an electrical signal through at least one of the first and second electrical coils to generate a different electrical signal in the other of the first and second electrical coils.

11. The method of claim 7 further comprising calculating a value associated with at least one of convection heat transfer between the fluid within the housing and the housing, conduction heat transfer through the wall of the housing, and radiation heat transfer from the wall to atmosphere around the housing.

12. The method of claim 11 further comprising adjusting the estimate of the temperature of the fluid within the housing as a function of the calculated value.

13. The method of claim 12 further comprising defining a type of material and at least one of a thickness, an internal surface area, an external surface area, and a volume of material of the housing.

14. A system for estimating a temperature of a fluid of a transformer, the system comprising:
a first sensor configured to measure a temperature of a housing of the transformer, the first sensor being fluidly isolated from the fluid contained in the housing;
a second sensor configured to measure an ambient temperature around the housing; and
a controller connected to the first sensor and the second sensor and configured to estimate a temperature of the fluid contained in the housing.

15. The system of claim 14 further comprising a first coil and a second coil that are inductively coupled to one another within the housing and exposed to the fluid contained in the housing.

16. The system of claim 14 further comprising a third sensor configured to measure an ambient humidity around the housing.

17. The system of claim 16 wherein the third sensor is connected to the controller and the controller is configured to adjust the estimate of the temperature of the fluid contained in the housing as a function of the measured ambient humidity.

18. The system of claim 17 wherein the controller is further configured to calculate at least one heat transfer characteristic of at least one of the housing, the fluid contained in the housing, and an ambient fluid around the housing.

19. The system of claim 18 wherein the controller is configured to manipulate the estimate of the temperature of the fluid contained in the housing as a function of the calculated at least one heat transfer characteristic.

* * * * *